(12) United States Patent
Goebel

(10) Patent No.: US 6,430,992 B1
(45) Date of Patent: Aug. 13, 2002

(54) DEVICE FOR MEASURING THE FORCES GENERATED BY A ROTOR IMBALANCE

(75) Inventor: Eickhart Goebel, Pfungstadt (DE)

(73) Assignee: Snap-On Technologies, Inc., Lincolnshire, IL (US)

(*) Notice: Subject to any disclaimer, the term of this patent is extended or adjusted under 35 U.S.C. 154(b) by 0 days.

(21) Appl. No.: 09/646,157

(22) PCT Filed: Aug. 30, 1999

(86) PCT No.: PCT/EP99/06372

§ 371 (c)(1),
(2), (4) Date: Nov. 28, 2000

(87) PCT Pub. No.: WO00/14503

PCT Pub. Date: Mar. 16, 2000

(30) Foreign Application Priority Data

Sep. 2, 1998 (DE) .......................................... 198 39 976
Sep. 30, 1998 (DE) .......................................... 198 44 975

(51) Int. Cl.⁷ ................................................ G01M 1/00
(52) U.S. Cl. ............................................. 73/66; 73/471
(58) Field of Search ........................... 73/66, 570, 460, 73/471

(56) References Cited

U.S. PATENT DOCUMENTS 5,189,912 A    3/1993    Quinlan
5,600,062 A  * 2/1997    Moench ........................ 73/462

FOREIGN PATENT DOCUMENTS

| DE | 29 20 030 | 1/1980 |
|---|---|---|
| DE | 33 30 880 | 3/1984 |
| DE | 43 29 831 | 3/1995 |
| EP | 0 133 229 | 2/1985 |
| EP | 0 343 265 | 11/1989 |
| WO | WO 97/16882 | 5/1997 |
| WO | WO 98/10261 | 3/1998 |

* cited by examiner

Primary Examiner—Richard A. Moller
(74) Attorney, Agent, or Firm—Shook, Hardy & Bacon LLP

(57) ABSTRACT

A device for measuring forces generated by unbalance of a rotor, in particular a motor vehicle wheel, includes a stationary frame, an intermediate frame positioned radially within the stationary frame, and first levers supporting the intermediate frame on the stationary frame. The first levers are arranged along imaginary lines that are either parallel to each other or intersect at a first virtual mounting position. A pivot bearing is supported on the intermediate frame by second levers, which are arranged along imaginary lines that intersect at a second virtual mounting position. Mounted coaxially in the pivot bearing is a measuring shaft, which is rotatable about a common axis of the measuring shaft and the pivot bearing. An outer force sensor measures displacement between the intermediate frame and the stationary frame. An inner force sensor measures displacement between the pivot bearing and the intermediate frame.

25 Claims, 10 Drawing Sheets

DEVICE FOR MEASURING THE FORCES GENERATED BY A ROTOR IMBALANCE

This application is the national phase of international application PCT/EP99/06372 filed Aug. 30, 1999 which designated the United States.

BACKGROUND OF THE INVENTION

1. Field of the Invention

The invention relates to a device for measuring forces that are generated by unbalance of a rotor.

2. Description of Related Art

A device for measuring forces that are generated by unbalance of a rotor is known, as shown by DE 33 32 978 A1. In such a device, it is known to mount the measuring shaft rotatably in two bearing units arranged at an axial distance from each other and supported via force sensors opposite a hollow bearing housing. This measuring shaft mounting is carried by a stationary frame.

From EP 0 343 265 A1 it is known, in the case of a balancing machine, to mount a backing girder—extending axially relative to the measuring shaft—in a pivotal manner with respect to a stationary frame. Sensors are arranged at an axial distance from each other, between the backing gird and the stationary frame. From DE 33 30 880 A1 it is known to support on a stationary frame a support—receiving the measuring shaft rotary mounting—via force transmitters arranged at an axial distance from each other In a device known from EP 0 133 229 A1 used for balancing motor vehicle wheels, the measuring shaft is supported on a stationary frame in a mounting that has a force transmitter. To achieve a dynamic balancing, two mounting planes in which the force transmitters are also arranged are provided for the mounting of the measuring shaft.

From EP 0 058 860 B1 a balancing machine for rotary bodies is known in which the measuring shaft is mounted rotatably on an elastically flexible flat part arranged vertically on the machine bed. For this, the rotary mounting of the measuring shaft is provided at the upper edge of the flat part. Position excursions of the flat part are detected via an arm of sensors running at right angles to the flat part; the sensors' force initiators run perpendicular to each other. In this connection, one of the sensors records the static portion while the other sensor detects the forces resulting from the dynamic unbalance and causing a twisting of the vertical, elastically flexible flat part around a center line, for example.

Furthermore, from DE-AS 16 98 164 an oscillation-measuring (supercritical) measuring system is known for mounting a rotor on leaf springs positioned diagonally to each other and whose extensions form a virtual intersection in one of the balancing planes of the rotor to be balanced. The two leaf springs positioned diagonally to each other are supported against a base plate via an intermediate plate on vertically standing leaf springs arranged parallel to each other. By means of oscillation transformers the vibrations of the leaf springs resulting from a rotor unbalance are detected and converted into corresponding measuring signals.

From DE-AS 10 27 427 and DE-AS 10 44 531 it is known, in the case of spring bars or plate springs that form oscillatory mountings in balancing machines, to form joints by thinning points.

The force sensors provided in known devices in the mounting planes at the measuring points supply sensor signals that are proportional to the centrifugal forces that result from the rotor unbalance and bring about the reaction forces measured by the sensors. With the conventional standard measuring systems for wheel balancing machines, a floating mounting is typical for the measuring shaft and the rotor clamped onto it. Translation onto the two balancing planes on the rotor for the dynamic balancing of the unbalance takes place based on the force lever law of statics. The forces measured in the two mounting planes by the sensors are thus independent of the respective distance of the rotor from the two sensors. Since these distances are different, a superproportional error in the balancing masses calculated for the respective balancing planes when the sensitivity of one of the two measuring converters is modified due to different influences, e.g. due to temperature, ageing, impact, overload, shaking in transport, humidity influence and the like.

SUMMARY OF THE INVENTION

An object of the invention is to produce a device of the type mentioned in the beginning in which, due to the above-mentioned force dynamics a sensitivity modification of a measuring converter only slightly affects the mass balancing to be carried out in the balancing planes, e.g. by balancing weights to be attached.

In accordance with this invention, the above object is attained by a device in which a rigidly designed intermediate frame, on which a measuring shaft is supported in a mounting plane displaying a force sensor, is supported on a stationary frame via a further force sensor. The two force sensors are thus respectively situated in two mounting systems for a force-measuring unbalance detection, with each force sensor assigned to one of the two mounting systems. The two mounting systems are situated between the measuring shaft and the stationary frame, e.g., the balancing machine, on which the unbalance measurement is carried out on a motor vehicle wheel. In this connection, the force sensors may be situated in different mounting planes nevertheless situated in the area of the rigid intermediate frame, or in a common mounting plane.

With the design of the above-mentioned mounting systems, at least one more support is provided for the measuring shaft. The support has the property of a virtual mounting position in a further mounting plane. Two such mounting planes with such virtual mounting positions are provided for. The virtual mounting positions may be situated on both sides of the rotor to be measured. It is also possible, however, to provide for only one additional mounting plane having a virtual mounting position; this plane being situated preferably between the two balancing planes of the rotor or between the planes in which the force sensors are situated and the rotor.

The two force sensors are preferably arranged in a common mounting plane that runs perpendicular to the axis of the measuring shaft. The forces initiated in the force sensors as reaction forces are oriented parallel, particularly coaxially to each other and are situated in the common mounting plane. The force sensors may be situated in the area of the axial extension of the intermediate space in different mounting planes.

In a preferred embodiment, the measuring shaft is supported on the intermediate frame in a first mounting plane displaying a force sensor and in a second mounting plane displaying the virtual support point, and the intermediate fame in the one mounting plane is supported against the stationary frame via the second force sensor and, furthermore, is linked to the stationary frame by means of a parallel guide. The mounting plane displaying the dual support point can be situated between the rotor, particularly a motor vehicle wheel, and the mounting plane that has the two force sensors, or preferably between the two balancing planes of the rotor, particularly a motor vehicle wheel.

The intermediate frame can be supported via a pair of first support levers and joints at the respective ends of the first support levers. The measuring shaft can also be supported via a pair of second support levers and joints at the ends of the second support levers on the intermediate frame. The axes of the respective joints run perpendicular to the plane in which the forces introduced into the force sensors and the axis of the measuring shaft are situated. The pair of first support levers supporting the intermediate frame on the stationary frame can be provided in parallel to each other. For this, the first support levers run parallel to each other. It is also possible, however, to arrange the first support levers at an angle to each other, with the apex of the angle preferably situated in the axis of the measuring shaft or in the vicinity of this measuring shaft axis. The joints of the first support levers define the corners of a trapezoid. With this arrangement, the virtual mounting position situated on the outer side of the rotor is created. The virtual mounting position—support inside the rotor, particularly between the balancing planes—can also be formed by support levers arranged at an angle to each other and whose joints are supported in the corners of a horizontal trapezoid of the support lever arrangement. The support levers are preferably formed as rigid flat members, e.g., sheet metal parts, cast parts, rolled flat parts and the like which ensure along with the joints that the desired force e.g. running essentially linearly and axially, is introduced into the sensors. The support lever arrangement formed from the flat parts can be designed as a one-piece construction, wherein the flat parts are designed rigid and only the joints situated in between and running essentially linearly are flexible. The joints can be formed by weak points, e.g. constrictions between the individual flexible flat parts. In this way, flexible joint axes are formed between the flexible flat parts. With the corresponding arrangement, parallel or at an angle, the desired virtual mounting positions that are formed in the respective linearly extending mounting axes are then created, as explained above.

The virtual mounting positions are also the measuring points taken into account in the frame calculator of the balancing machine and representing vial measuring points.

BRIEF DESCRIPTION OF THE DRAWINGS

By means of the figures, embodiments of the invention are explained in greater detail. The following are shown.

DETAILED DESCRIPTION OF THE INVENTION

Figure 1:
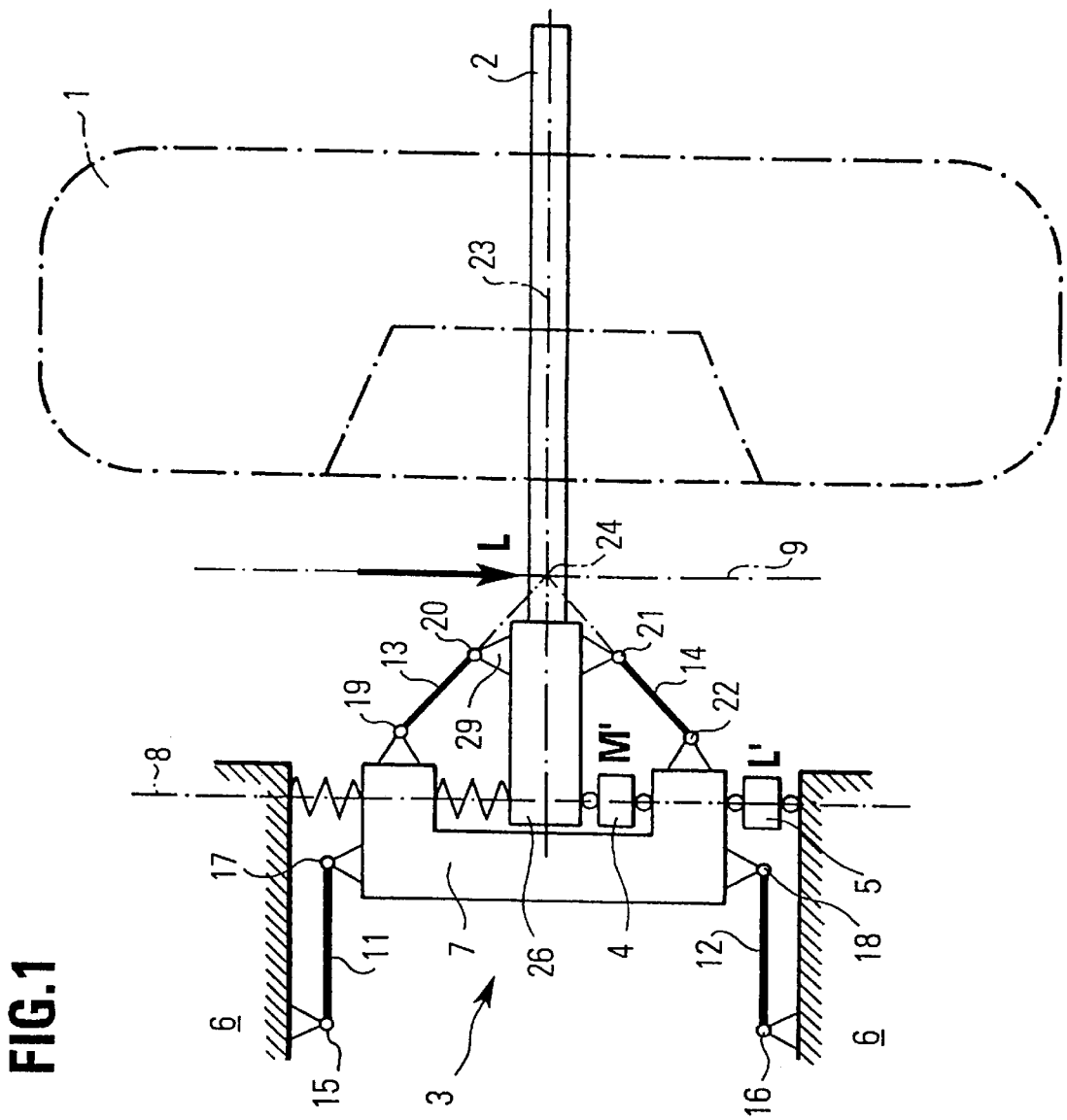
FIG. 1 is a schematic of a first embodiment of the invention.
Figure 2:
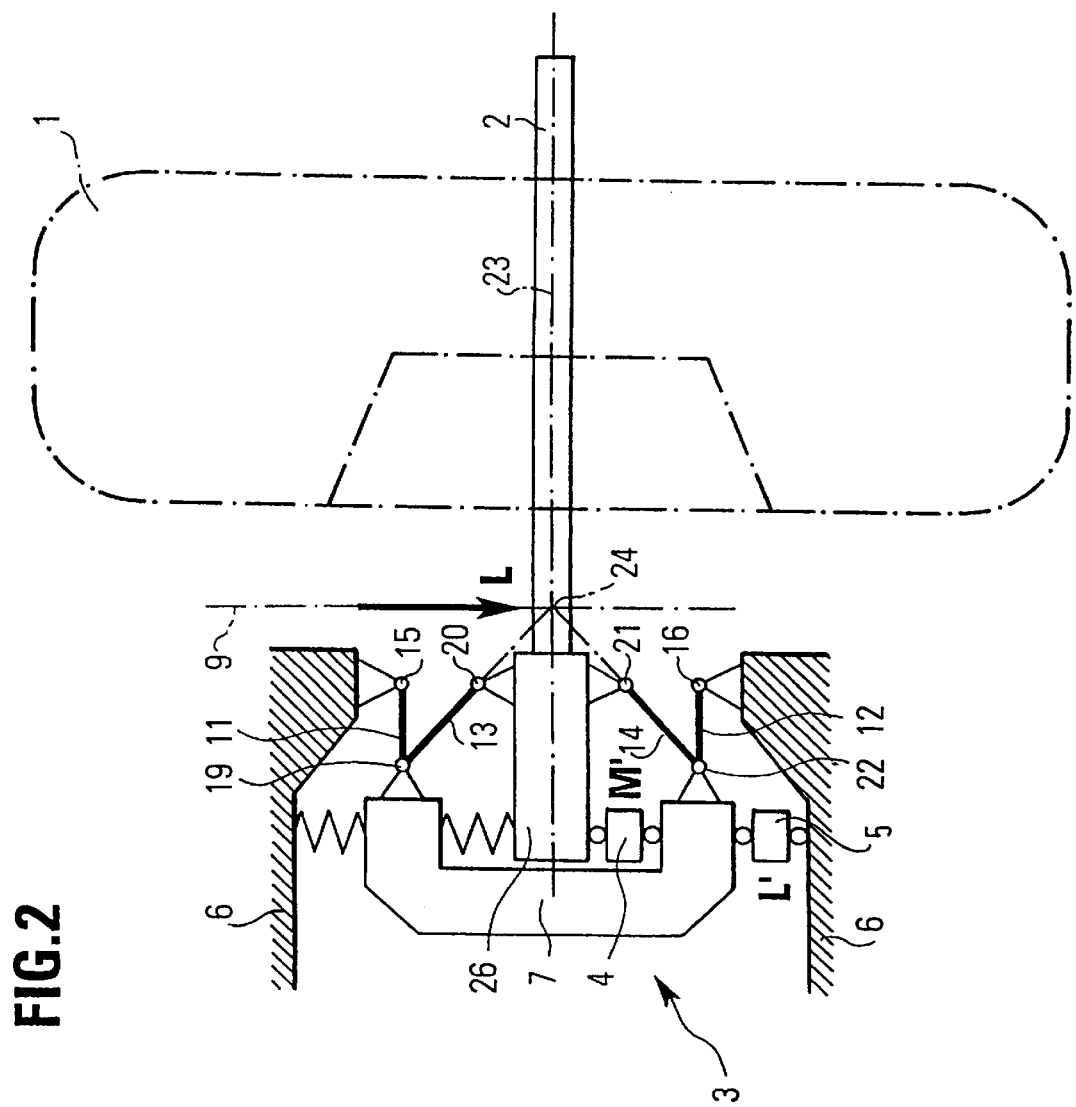
FIG. 2 is a schematic of a second embodiment of the invention.

A rotor 1 is shown in a schematic diagram in the figures; the rotor 1 is attached for unbalance measuring to the measuring shaft 2 in known manner by clamping means (not illustrated in any further detail). The measuring shaft 2 is mounted rotatably on a stationary frame 6, which can be the machine frame of a wheel balancing machine. A mounting 3 having force sensors 4, 5 is used to mount the measuring shaft 2. The mounting 3 may include a tubular rotating bearing 26 in which the measuring shaft 2 is mounted rotatably. The rotary bearing 26 that receives the measuring shaft 2 is rigidly mounted in a first mounting plane 8 on an intermediate frame 7 over the inner sensor 4. In addition, a virtual support point (also referred to herein as a virtual mounting position) 24 is established in another mounting plane 9 by second support levers 13, 14 that form a support lever pair and run at an angle to each other. The second support levers 13, 14 are arranged along imaginary lines or planes that intersect at the virtual support point 24. The support point 24 acts like a swivel pin that runs perpendicular to the direction of force introduction of the reaction forces resulting from the unbalance measurement into the sensor 4. The support levers 13 and 14 have ends connected flexibly (at joints 19 and 22) with the intermediate frame 7 and opposite ends connected flexibly (at joints 20, 21) with the rotating bearing 26, which receives the measuring shaft 2. The joint axes of the joints 19 through 22 run parallel to the swivel pin that is formed in the virtual mounting position 24. As shown in FIGS. 1 and 2, the virtual mounting position 24 can be situated between the rotor 1 and the mounting plane 8 in which the force sensors 4 and 5 are situated. Alternatively, as shown in FIGS. 1 and 2, the virtual mounting position 24 may be situated in the area of the rotor between the balancing (compensating) planes 27, 28 in which the unbalance is balanced, for example, by attaching balancing weights.

The intermediate frame 7 is supported on the stationary frame 6 via the outer force sensor 5. The force sensor 5 may be arranged in the mounting plane 8 situated perpendicular to the measuring shaft 2. It is also possible, however, to arrange the force sensor 5 in another mounting plane, shifted in the axial direction of the measuring shaft 2. Furthermore, the intermediate frame 7 is supported via a pair of support levers (i.e., first support levers 11 and 12) on the stationary frame 6. The support levers 11, 12 have ends connected flexibly (at joints 15, 16) with the stationary frame 6, and opposite ends connected flexibly (at joints 17, 18 in FIGS. 1, 3, 5, 10 and FIGS. 7 through 9 or joints 19, 22 in FIGS. 2, 4 and 6) with the intermediate frame 7. The intermediate frame 7 is designed as a rigid mounting block or rigid, stiff mounting frame.

In the embodiments of FIGS. 1 and 2 as well as FIGS. 5 through 9, the support levers 11 and 12 run essentially parallel to each other and parallel to the axis 23 of the measuring shaft 2. The support levers 11 and 12 thus form a parallel steering guide for the force introduction into the force sensor 5—directed essentially perpendicular to the axis 23 of the measuring shaft 2—of the reaction forces resulting during the unbalance measuring process.

Figure 3:
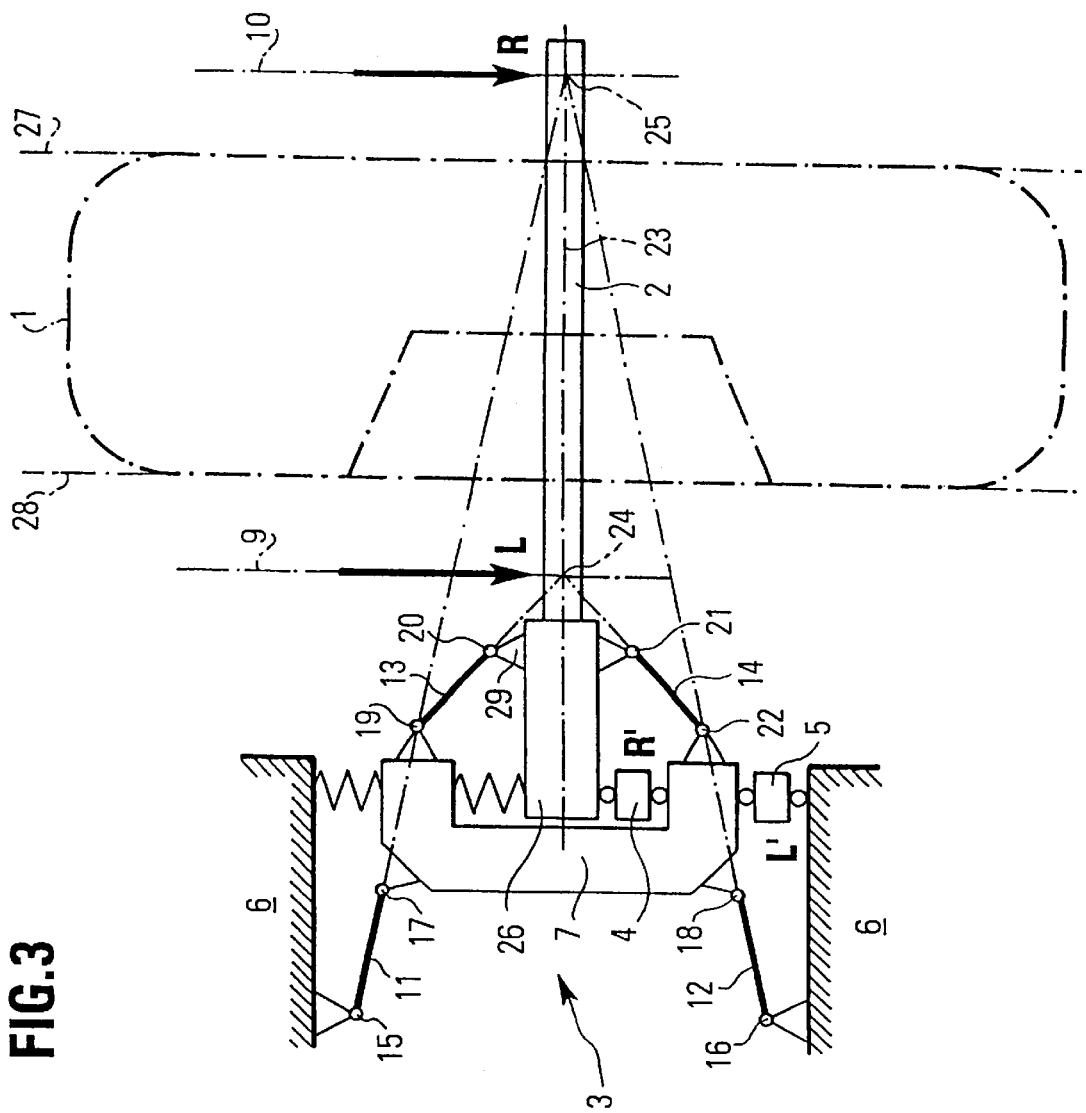
FIG. 3 is a schematic of a third embodiment of the invention.
Figure 4:
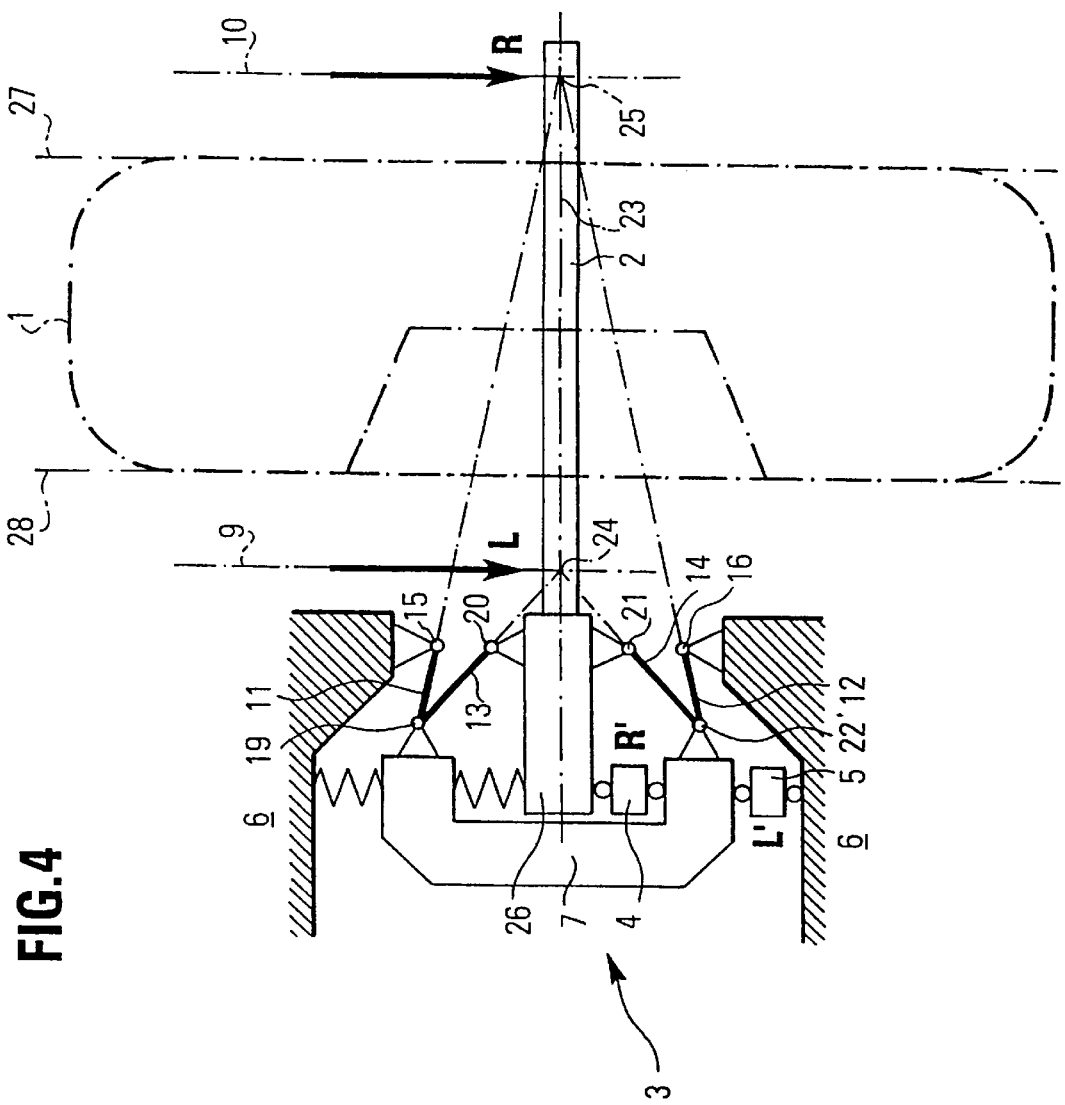
FIG. 4 is a schematic of a fourth embodiment of the invention.
Figure 5:
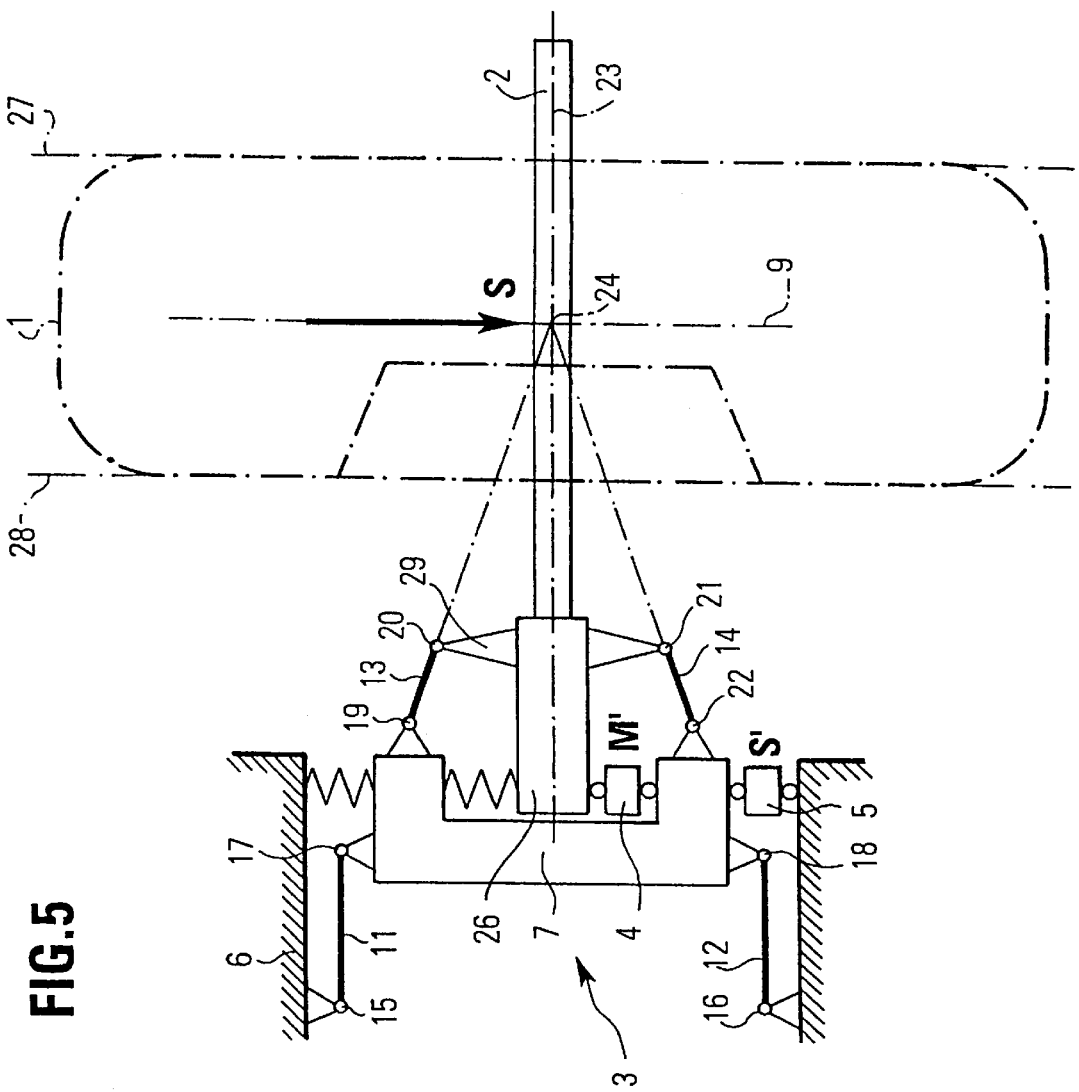
FIG. 5 is a schematic of a fifth embodiment of the invention.
Figure 10:
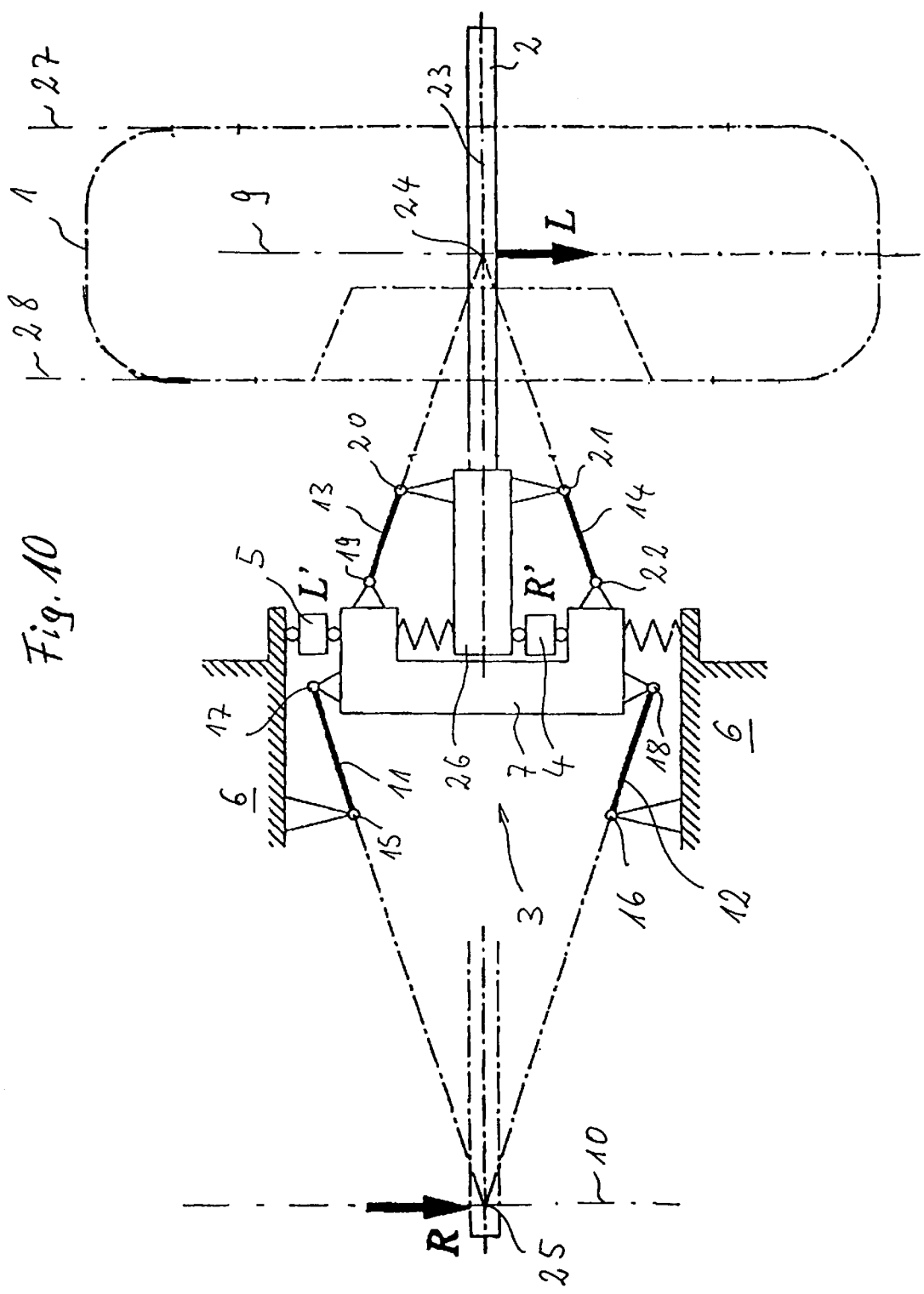
FIG. 10 is a schematic of a seventh embodiment of the invention.

In the embodiments of FIGS. 3, 4 and 10, the two support levers 11 and 12 are arranged at a sharp angle to each other, the apex of which is situated in the axis 23 of the measuring shaft 2 or in the vicinity of the axis 23. This apex forms a first virtual mounting position 25 in a mounting plane 10 situated on the outside of the rotor 1 and extending perpendicular to the measuring shaft 2.

In the embodiment of FIG. 10 the first virtual mounting position 25 and the mounting plane 10 are situated in an extension, indicated as a dot-dash structure, of the measuring shaft 2 that runs—with respect to the mounting 3 of the measuring shaft 2—opposite the longitudinal extension of the measuring shaft 2. The first virtual mounting position 25 and the related mounting plane 10 are situated—with respect to the mounting 3—on the side opposite the rotor 1 from the measuring shaft 2.

The virtual mounting position 25 also has the property of a swivel pin that is situated perpendicular to the axis 23 of the measuring shaft 2 and perpendicular to the direction of introduction of the forces into the force sensors 4 and 5. In the illustrated embodiments, this force introduction takes place in the mounting plane 8. To form the swivel pin property in the respective virtual mounting positions 24 and 25, the joint axes of the joints 15 through 22 run parallel to each other and perpendicular to the axis 23 of the measuring shaft 2 and to the force introduction direction of the reaction forces into the force sensors 4 and 5 in the mounting plane 8.

In the embodiments of FIGS. 3 and 4, on opposite sides of the rotor 2, namely on the inside and the outside of the rotor 2, mounting planes 9 and 10 are respectively created with the virtual mounting positions 24 and 25. The virtual mounting positions 24 and 25 have the properties of virtual measuring points. Forces L assigned to the inner mounting position 24 and forces R assigned to the outer mounting position 25 are introduced into the force sensor 4. The force sensors 4 and 5 generate corresponding sensor signals L' and R'. That virtual measuring points are also created in the virtual mounting positions 24 and 25 results from the fact that when a centrifugal force generated from the rotor unbalance engages the left mounting plane 9, a measuring signal L' proportional to the value of this centrifugal force is emitted by the force sensor 5, while the force sensor 4 emits no signal. When the right outer mounting plane 10 is engaged by a centrifugal force R resulting from the rotor unbalance, only the force sensor 4 emits a proportional measuring signal R', while the force sensor 5 generates no signal. This results in a floating mounting in which the balancing planes 27 and 28 are situated on the rotor 1 between the virtual measuring points/virtual measuring planes that concur with the mounting planes 9 and 10, as shown in FIGS. 3 and 4. In the case of a force engagement—resulting from the rotor unbalance—between the mounting planes 9 and 10, the mounting forces effective in these planes (virtual measuring planes) are divided up according to the mounting distances from the engagement point and corresponding sensor signals are emitted by the force sensors 4 and 5.

In the embodiment shown in FIG. 10, the one virtual mounting position 24 at which a centrifugal force L resulting from the rotor unbalance can be effective is situated in the mounting plane 9 between the two balancing planes 27, 28, preferably roughly in the middle between the two balancing planes 27, 28. The other virtual mounting position 25 is situated with respect to the mounting 3 of the measuring shaft 2 on the other side in the extension of the measuring shaft 2. Here a centrifugal force R resulting from the rotor unbalance is active. As already explained above, the sensors 4 and 5 deliver measuring signals R' and L' proportional to the centrifugal forces R and L.

In the embodiment of FIGS. 1 and 2 as well as FIGS. 5 through 9, the outer virtual mounting position is situated at infinity or at a relatively great distance of several meters, e.g., from roughly 3 to 20 m or more, because, due to parallel arrangement of the support levers 11 and 12, essentially a parallel guide of the intermediate frame 7 is created. If a centrifugal force (L in FIGS. 1 and 2 and S in FIGS. 5 and 6) resulting from the rotor unbalance is introduced in these forms of construction in the mounting plane 9 (virtual measuring plane) at the virtual mounting position (virtual measuring point), this force is only detected by the force sensor 5 and a proportional signal L'/S' is emitted by it. The force sensor 4 emits no signal. Regardless of the distance of the introduced centrifugal force, the force sensor 5 will only emit a signal proportional to the centrifugal force value due to the parallel guide of the intermediate frame 7. The force sensor 4, on the other hand, will emit a measuring signal M' that is not only proportional to the centrifugal force value and thus to the unbalance value, but also to the distance of the force introduction point of the mounting plane 9/the virtual mounting position 24.

Figure 6:
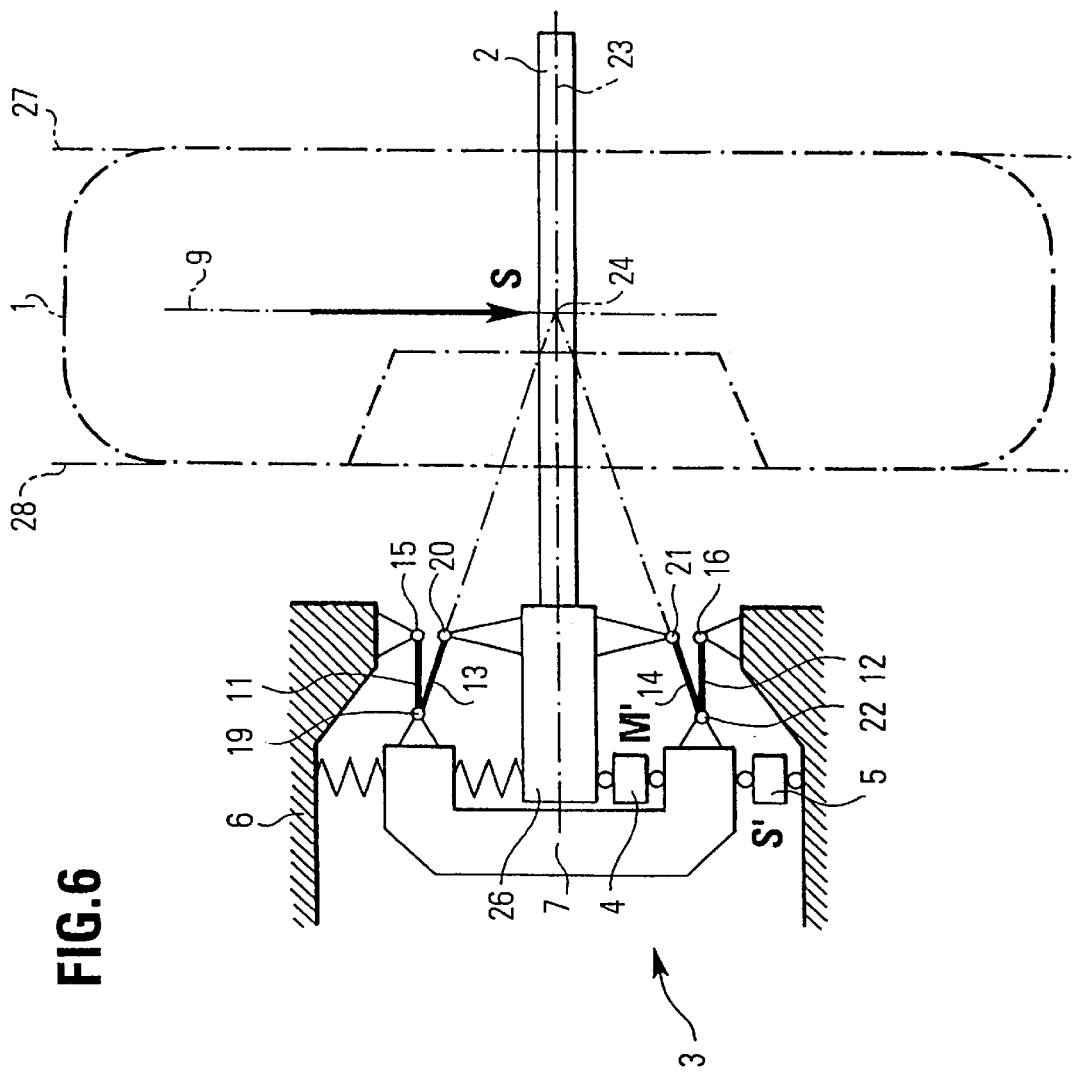
FIG. 6 is a schematic of a sixth embodiment of the invention.
Figure 7:
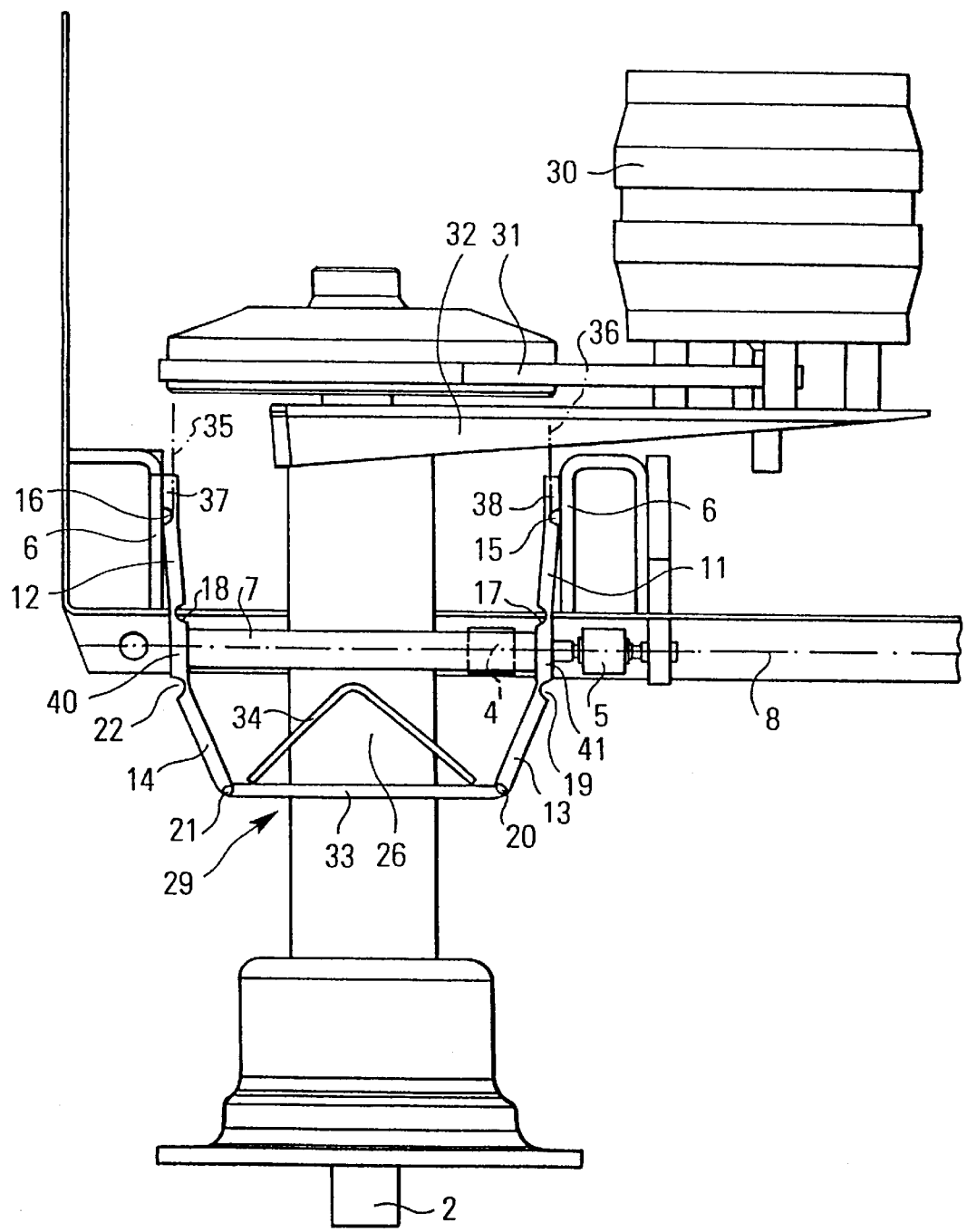
FIG. 7 is a top view of a measuring arrangement and mounting for the measuring shaft, as may be used in the embodiments of FIGS. 1, 3 and 5.
Figure 8:
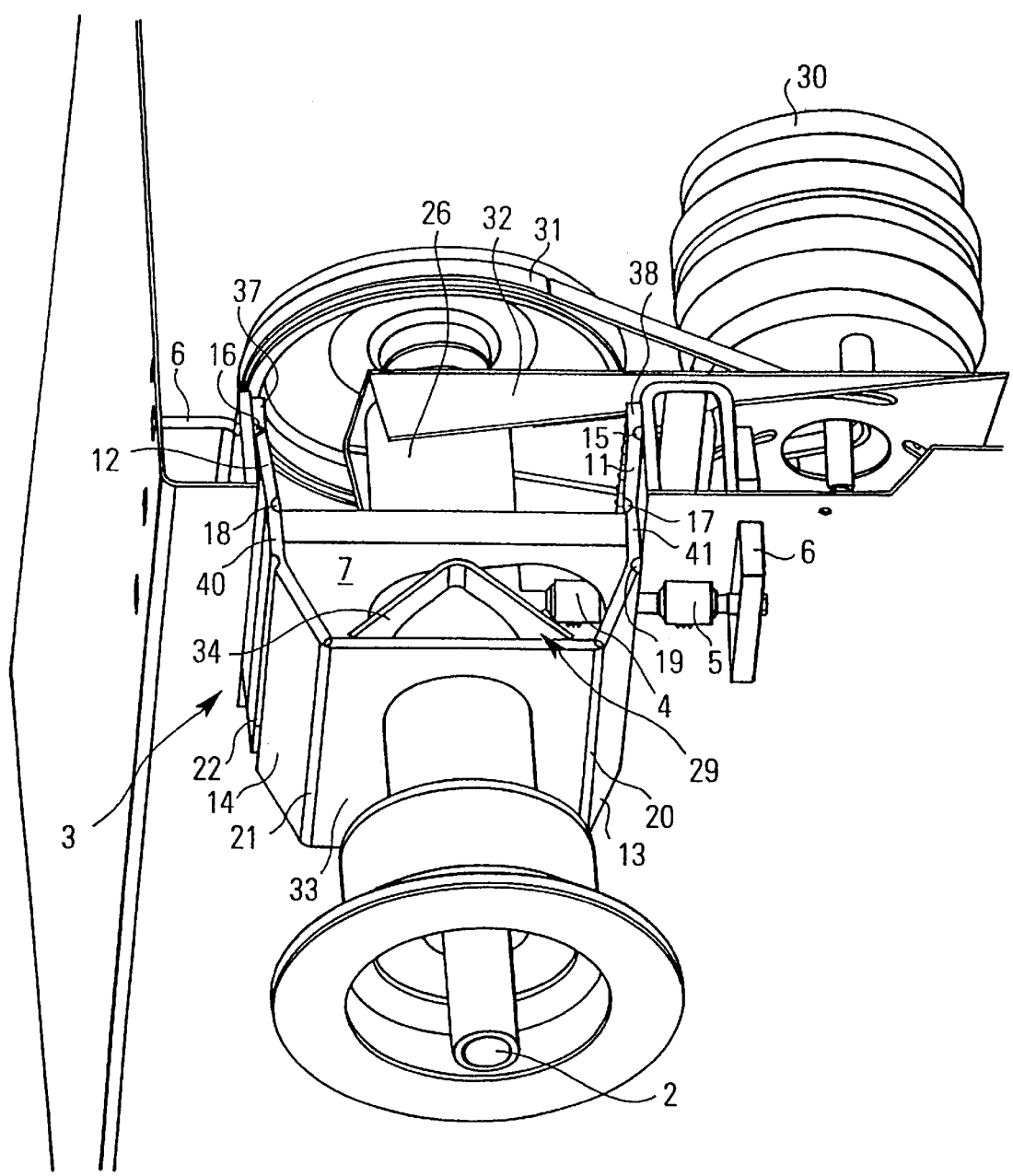
FIG. 8 is a perspective view of the measuring arrangement of FIG. 7 seen from the front to the back.
Figure 9:
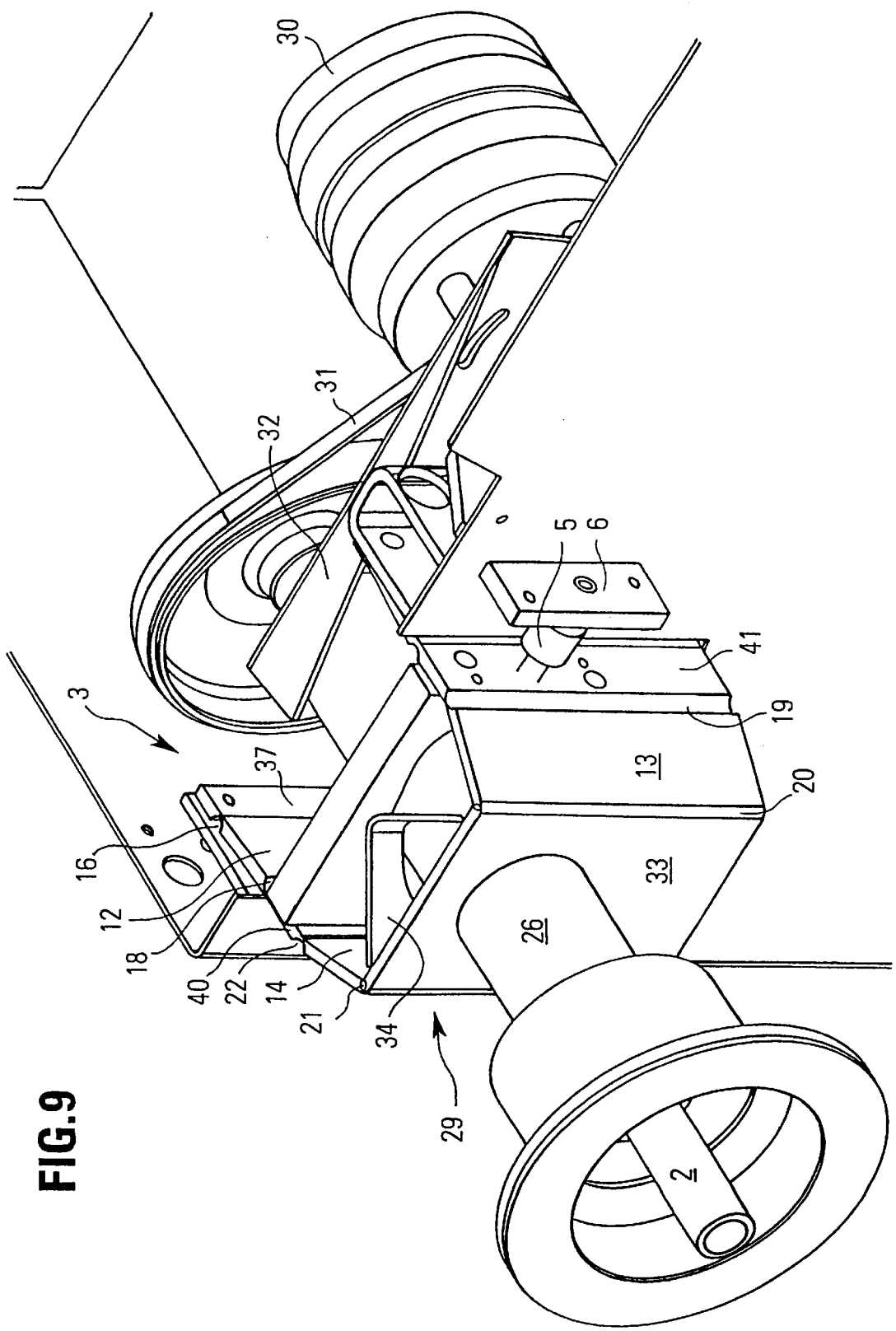
FIG. 9 is a perspective illustration of the measuring arrangement of FIGS. 7 and 8 seen from above and from the side.

In the forms of construction of FIGS. 1, 3, 5 and 10 as well as FIGS. 7 through 9, the intermediate frame 7 is supported on the stationary frame 6 with the help of the support lever pair formed by the support levers 11 and 12, and the tubular rotary mounting 26 of the measuring shaft 2 is supported by the support lever pair formed by the support levers 13 and 14, one behind the other when observed in axial direction of the measuring shaft 2. The support lever pairs of the embodiments of FIGS. 3 and 4 have the same direction of inclination. In the embodiment depicted in FIG. 10, the support lever pair 11, 12 has a direction of inclination that is opposite to the direction of inclination of the support lever pair 13, 14. In the embodiments of FIGS. 2, 4 and 6, the support frame 7 is supported on the stationary frame 6 and the rotary mounting 26 of the measuring shaft 2 is supported on the intermediate frame 7 with the respective support lever pair 11, 12 above (outside) support lever pair 13, 14. The joints 17, 19 and 18, 22 can fall together as the common joints 19 and 22 on the intermediate frame 7, as illustrated in FIGS. 2, 4 and 6.

The support levers 11 through 14 can be formed by flat parts (or members) that are designed rigid and stiff. The flat parts can be formed of one piece, in connection with which the joints are formed by linear weak points, e.g. in the form of constrictions. As can be seen from FIGS. 7 through 9, the retaining device 29 comprises a retaining plate 33 that can be formed as a one-piece construction with the flat parts for the support levers 11 through 14. The retaining plate 33 is fixedly connected with the tubular rotary mounting 26, for example, by welding. In addition, an angle bracket 34 can also be provided as a component of the retaining device 29. The angle bracket 34 is also fixedly connected with the retaining plate 3 and the rotary mounting 26, for example by welding. In the figures, the upper angle bracket 34 is illustrated. A lower angle bracket can also be provided. The upper and lower angle brackets can also include an elbow, in which the rotary mounting 26 is connected fixedly and in guided manner through an opening in the elbow, e.g., by welding with the elbow. In this way, a rigid, stiff connection of the retaining device 29 with the rotary mounting 26 between the two joints 20 and 21 is created. The joints 20 and 21 are situated between the two support levers 13 and 14 and the retaining plate 33.

From the one piece from which the flat parts for the support levers 11 through 14 are formed, attaching plates 37, 38 and 40, 41 can also be formed. The attaching plates 37, 38 are connected fixedly, for example by bolt connections or otherwise, with the stationary frame 6. The attaching plates 37 and 38 form the attaching points for the support lever arm formed from the support levers 11 and 12 and with which the intermediate frame 7 is supported on the stationary frame 6. Between the attaching plates 37 and 38 and the flat parts that form the support levers 11 and 12, the joints 15 and 16 are formed by the linear weak points/constrictions. The weak points have a concave, particularly a semicircular cross-section.

In addition, the one-piece construction can include the two attaching plates 40 and 41 that are connected solidly, for example by bolt connections, welding or the like, with side surfaces of the intermediate frame 7. Between the two attaching plates 40 and 41 and the support levers 11 and 12, the joints 17 and 18 are formed by the weak points/constrictions. Between the flat parts that form the support levers 13 and 14, the joints 19 and 22 are formed by weak points/constrictions.

In this way, from a single piece practically the entire mounting 3 is formed with which the measuring shaft 2 is supported on the stationary frame 6 and which predetermines the virtual mounting positions and measuring points.

The parallel guiding of the intermediate frame 7 on the stationary frame results essentially from the fact that the outlines of the concave constrictions 15, 17 and 16, 18 are situated on both sides of the support levers 11 and 12 roughly in parallel planes 35 and 36, in which the guiding function of the two support levers 11 and 12 is achieved. The respective constrictions 15, 17 and 16, 18 are situated on opposite surfaces of the support levers 11 and 12 forming the flat parts. The support levers 11 and 12 are inclined toward each other at an extremely sharp angle, in connection with which, however, as already explained, the parallel steering guide is achieved by a guiding function in the parallel planes 35 and 36. In this way, measuring arrangements corresponding to FIGS. 1 and 5 can be achieved. In order to achieve a measuring arrangement corresponding to FIG. 3, the support levers 11 and 12 can be inclined toward each other at a correspondingly wider angle.

In order to implement the embodiment illustrated in FIG. 10, the support levers 11, 12 in FIGS. 7 through 9 are oriented toward each other at their rear ends. The rear constrictions/joints 15, 16 are situated more closely to the axis of the measuring shaft 2 than the front constrictions/joints 17, 18.

As FIG. 8 also shows, the two force sensors 4, 5 are arranged in a reference line, with the force sensor 4 arranged between the rotary mounting 6 and the inside of the intermediate frame 7 and the force sensor 5 between the outside of the intermediate frame 7/the attaching plate 41 (FIG. 9) and the stationary frame 6.

An electric motor 30 is provided for driving the measuring shaft 2 via a belt drive 31. The motor 30 is mounted on the rotary mounting 26 via an extension arm. With this mounting, the measuring result is not affected by disturbances resulting from the motor drive.

Observed in axial direction, a compact mounting 3 for the measuring shaft 2 on the stationary frame 6 is created. This results—in connection with the reduced force dynamics, particularly with a floating mounting of the measuring shaft 2—in a reduction of the influence of changes in sensitivity of the force recorders, for example, as a result of different effects of temperature, ageing, impact, overloading, shaking during transport and humidity, a reduced need to replace the force sensors, for readjustments of the measuring arrangement after transport and setup of the machine, reduced service costs, improved measuring precision, reduced demands on the resolution of the AD-converters during digitalization of the analog measuring signals and a greater virtual distance of the measuring planes in spite of the compact construction. Despite the stationary mounting of the measuring shaft, reduced force dynamics are achieved similar to those of a measuring arrangement with two mounting positions on both sides of the rotor.

What is claimed is:

1. A device for measuring forces generated by unbalance of a rotor, said device comprising:

a stationary frame;

an intermediate frame positioned radially within the stationary frame;

first levers supporting the intermediate frame on the stationary frame, the first levers being arranged along imaginary lines that are either parallel to each other or intersect at a first virtual mounting position;

a pivot bearing;

second levers supporting the pivot bearing on the intermediate frame, the second levers being arranged along imaginary lines that intersect at a second virtual mounting position;

a measuring shaft mounted coaxially in the pivot bearing and rotatably about a common axis of the measuring shaft and the pivot bearing, the measuring shaft having a mounting area for permitting attachment of the rotor therein, wherein the rotor has compensating planes in which the unbalance is balanced;

an outer force sensor for measuring displacement between the intermediate frame and the stationary frame; and an inner force sensor for measuring displacement between the pivot bearing and the intermediate frame.

2. A device according to claim 1, wherein the outer and inner force sensors are mounted in a common mounting plane.

3. A device according to claim 2, wherein the common mounting plane is perpendicular to the common axis.

4. A device according to claim 1, wherein the first and second virtual mounting positions both intersect the common axis, and wherein the outer and inner force sensors measure respective forces perpendicular to the common axis at the first virtual mounting position and the second virtual mounting position, respectively.

5. A device according to claim 1, wherein the first and second virtual mounting positions are arranged between the compensating planes.

6. A device according to claim 1, wherein the first and second virtual mounting positions both intersect the common axis along the measuring shaft.

7. A device according to claim 1, wherein the first levers are parallel to one another, and wherein the second virtual mounting position intersects the measuring shaft.

8. A device according to claim 7, wherein the imaginary lines along which the first levers are arranged are parallel to each other, so that the device includes the second virtual mounting position but not the first virtual mounting position.

9. A device according to claim 8, wherein the second virtual mounting position is situated between the compensating planes.

10. A device according to claim 8, wherein the second virtual mounting position is situated between the mounting area and the stationary frame.

11. A device according to claim 1, wherein the first and second virtual mounting positions are respectively positioned on opposite sides of the mounting area.

12. A device according to claim 1, wherein the mounting area is between the compensating planes.

13. A device according to claim 1, wherein the first virtual mounting position is positioned substantially centered between the compensating planes.

14. A device according to claim 1, wherein the first virtual mounting position intersects the common axis and is positioned on an opposite side of the intermediate frame relative to the measuring shaft.

15. A device according to claim 1, wherein the first levers comprise a first pair of levers, and wherein the second levers comprise a second pair of levers.

16. A device according to claim 15, wherein the levers of the first pair are positioned on diametrically opposite sides of the measuring shaft from each other, and wherein the levers of the second pair are positioned on diametrically opposite sides of the measuring shaft from each other.

17. A device according to claim 15, wherein the first levers are mounted to the intermediate frame and to the stationary frame by a first set of joints, wherein the second levers are mounted to the intermediate frame and the pivot bearing by a second set of joints, and wherein the joints of the first and second sets have respective axes that are perpendicular to the common axis and substantially perpendicular to forces measured by the inner and outer force sensors.

18. A device according to claim 17, wherein the levers of the first pair of levers are situated either parallel to one another or at angles selected to positioned the first virtual mounting position on the common axis.

19. A device according to claim 17, wherein the first and second levers comprise first rigid flat members and second rigid flat members, respectively, each of said rigid flat members being arranged between an associated ones of the joints.

20. A device according to claim 19, wherein the first rigid flat members have surfaces arranged in planes that are parallel to planes in which the surfaces of the second rigid flat members are arranged.

21. A device according to claim 20, wherein the first rigid flat members, the second rigid flat members, and the joints are formed of a one-piece construction, and the joints comprise structurally weak linear points.

22. A device according to claim 1, wherein:
the first virtual mounting position is offset relative to the common axis towards the side of the common axis on which the outer force sensor is located; and/or
the second virtual mounting position is offset relative to the common axis towards the side of the common axis on which the inner force sensor is located.

23. A device according to claim 1, wherein the outer and inner force sensors are mounted in a common mounting plane, wherein the pivot bearing is fixedly connected with a rigid holder at an axial distance from the common mounting plane, and wherein the second levers are angled relative to each other and support the rigid holder at respective joints.

24. A device according to claim 21, wherein the joints have a concave cross section.

25. A device according to claim 24, wherein the joints have linear perforations.

* * * * *